June 5, 1951 N. H. SWANSON 2,556,010
INDEXING MECHANISM FOR TRANSLATING A RECIPROCATORY
MOTION INTO A STEP-BY-STEP ROTARY MOTION
Filed Feb. 8, 1949 7 Sheets-Sheet 5
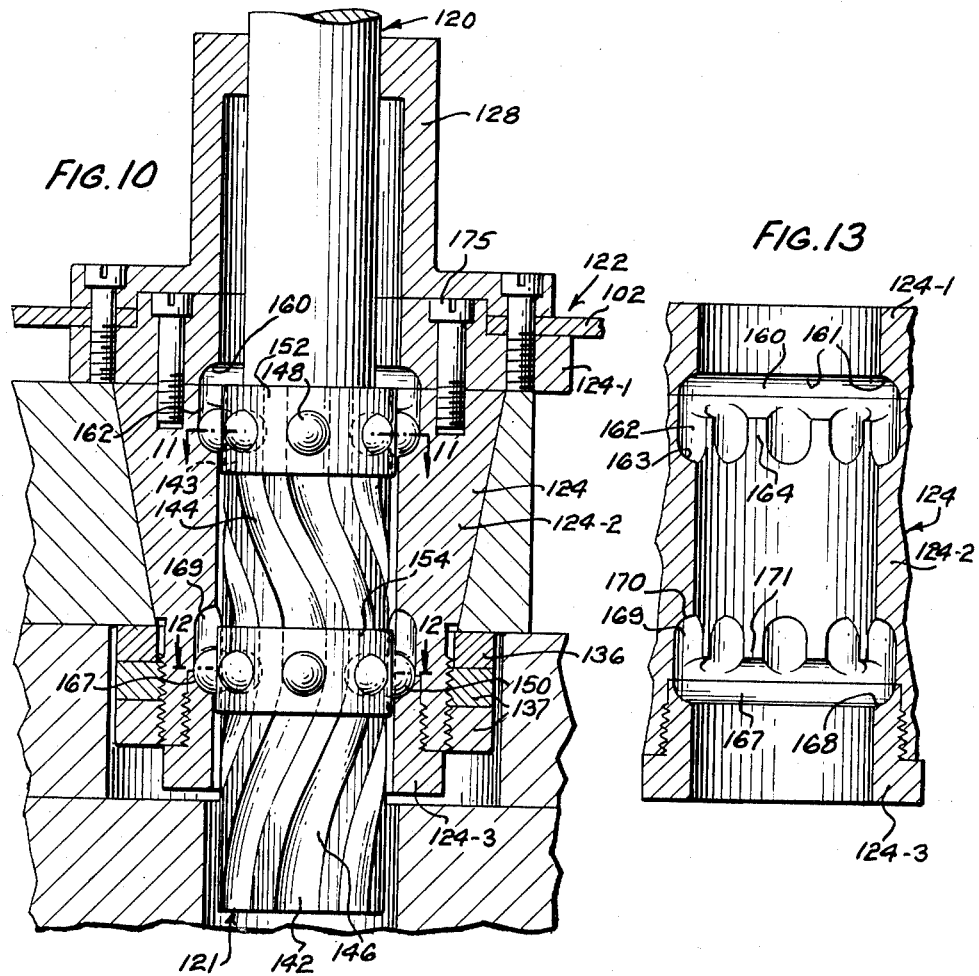
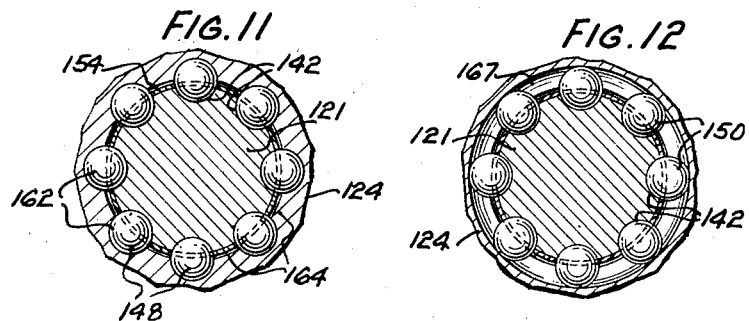
INVENTOR
N. H. SWANSON
BY E. F. Kane
ATTORNEY

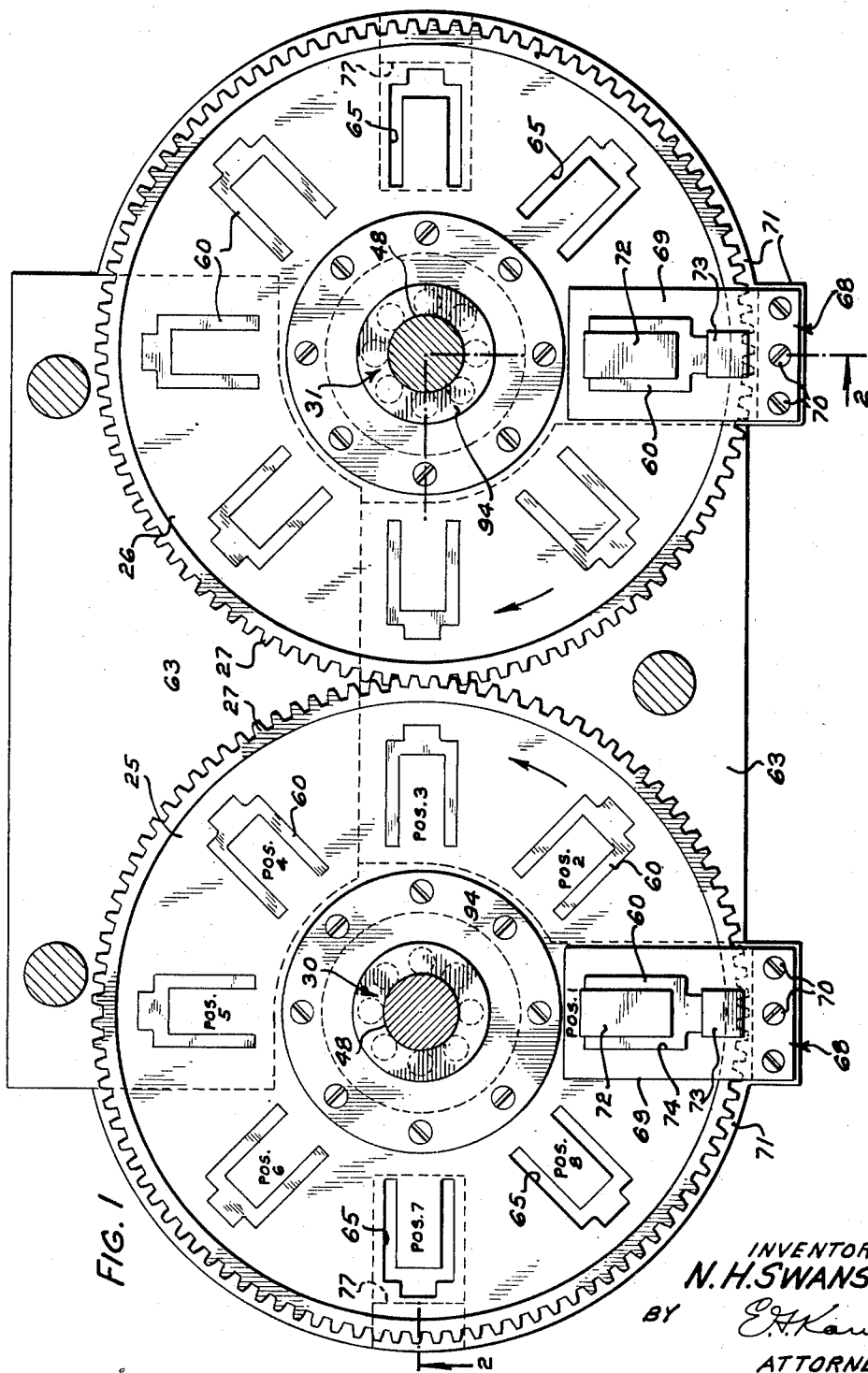

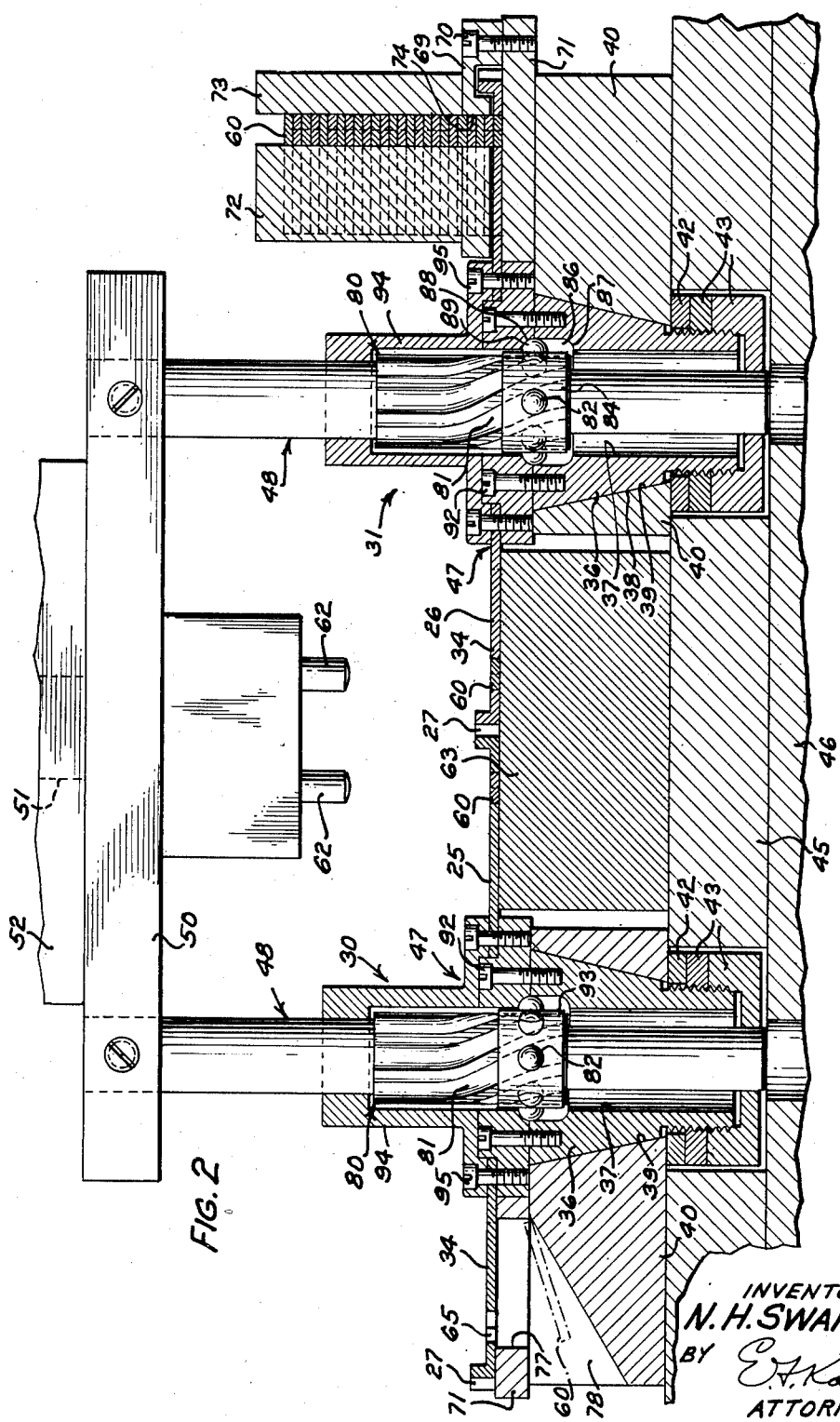

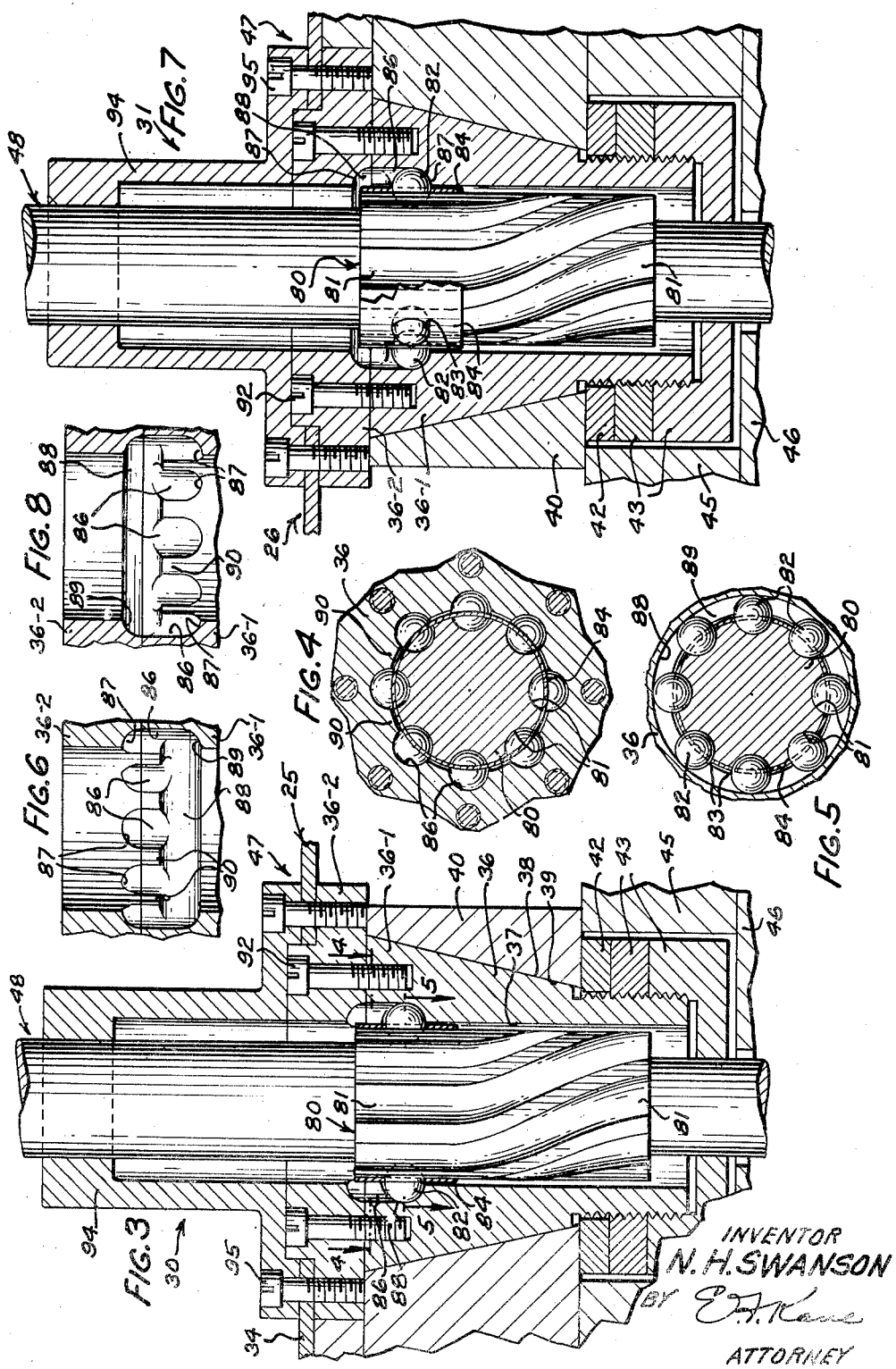

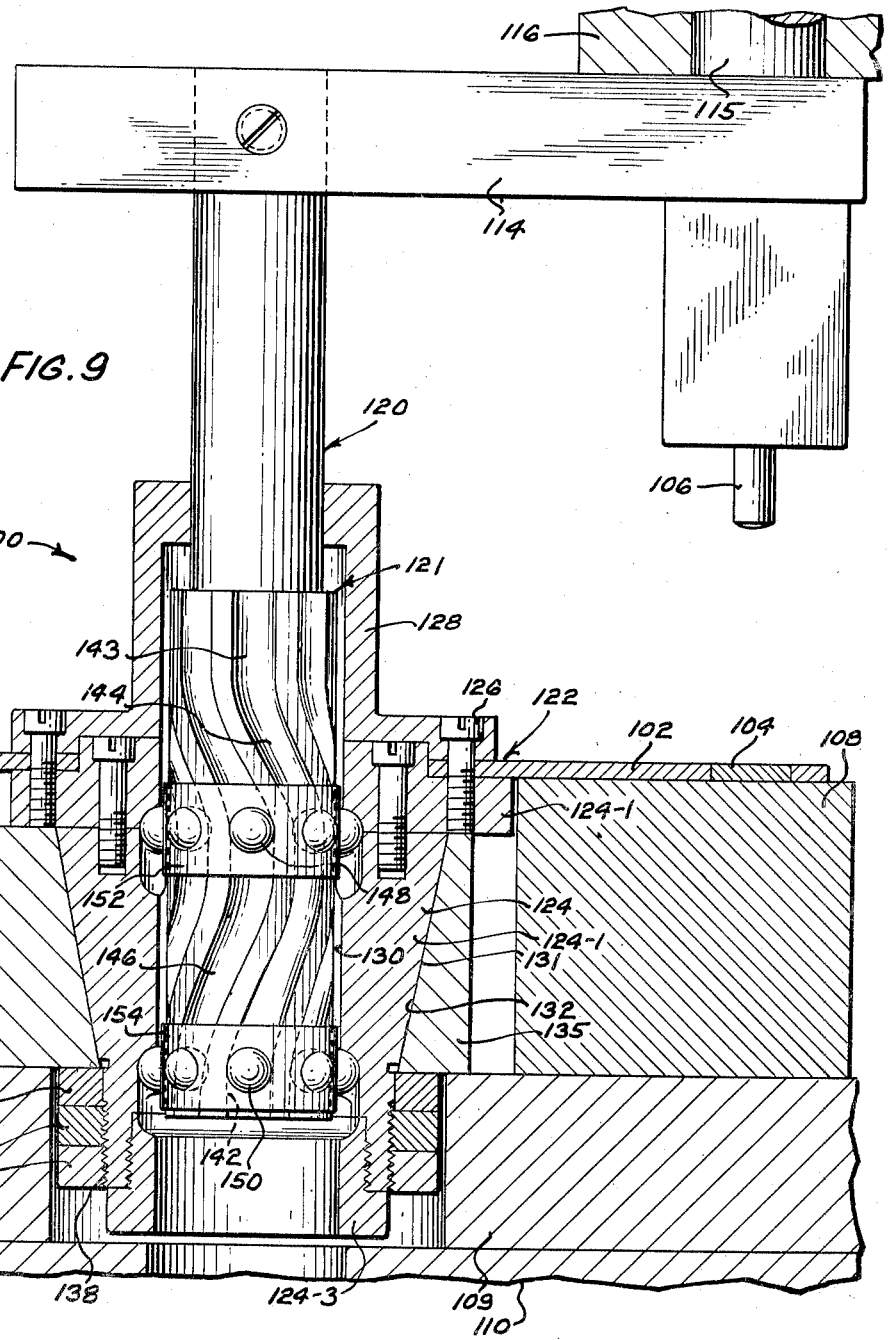

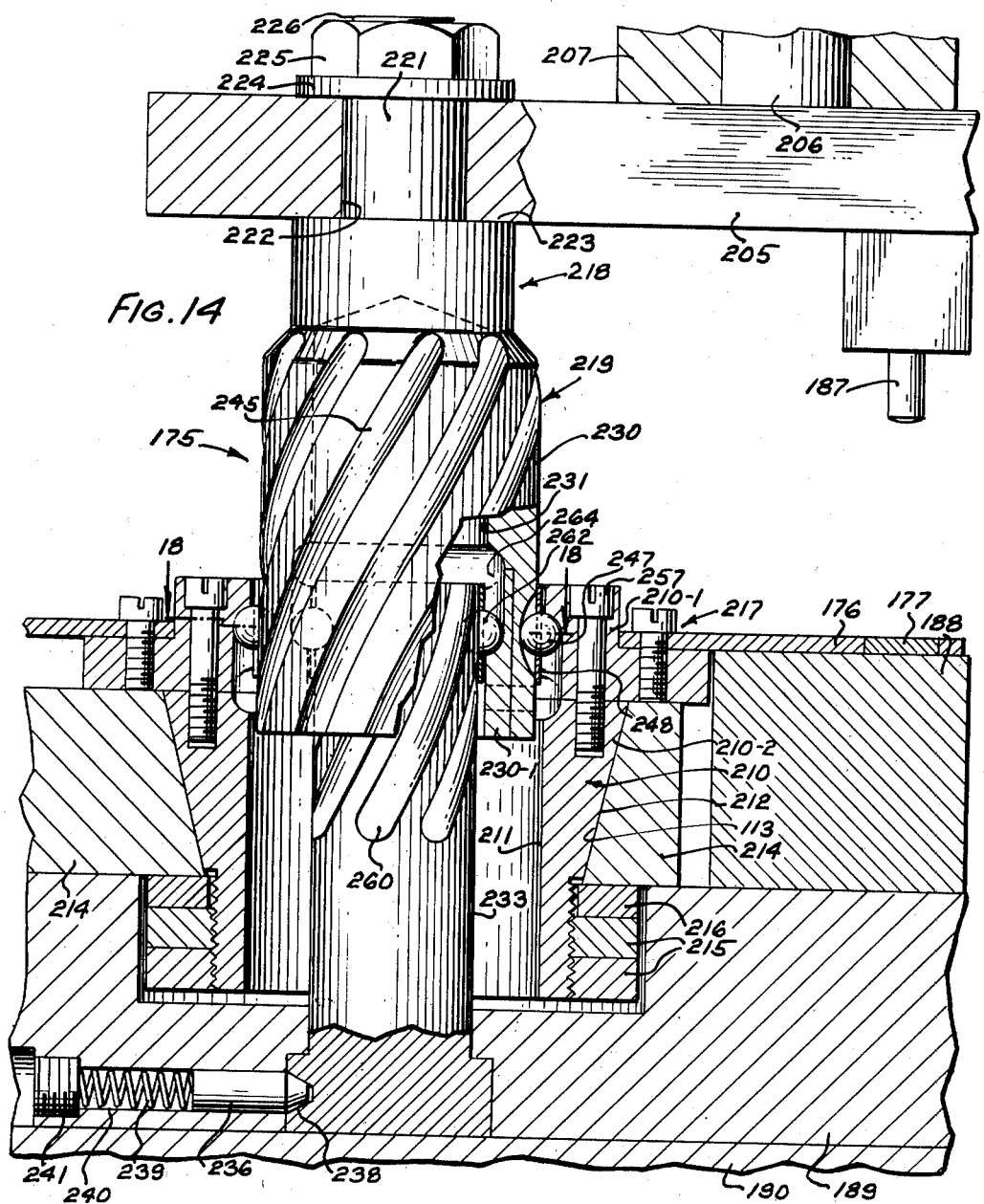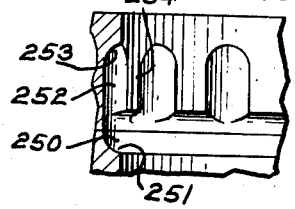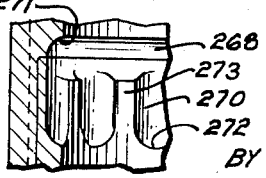

June 5, 1951
N. H. SWANSON
2,556,010
INDEXING MECHANISM FOR TRANSLATING A RECIPROCATORY
MOTION INTO A STEP-BY-STEP ROTARY MOTION
Filed Feb. 8, 1949
7 Sheets-Sheet 7
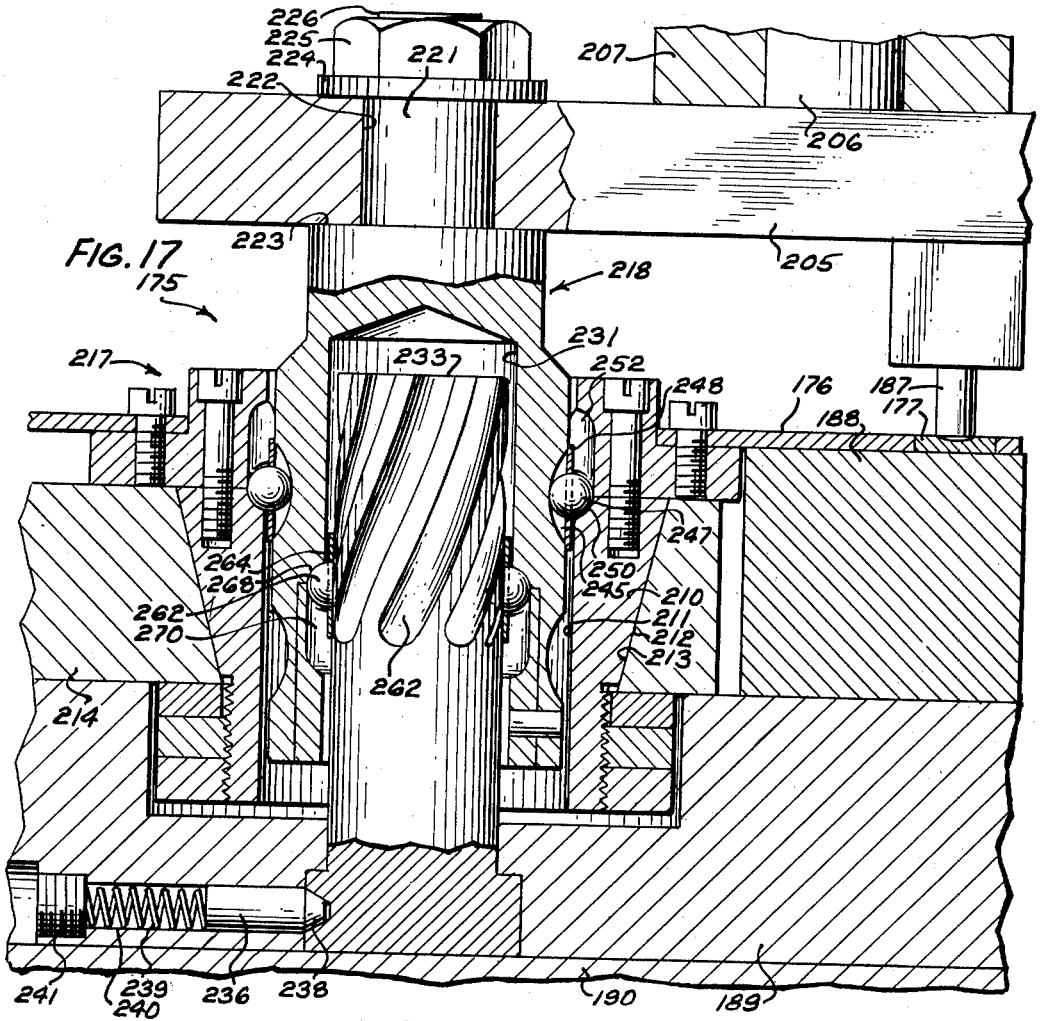
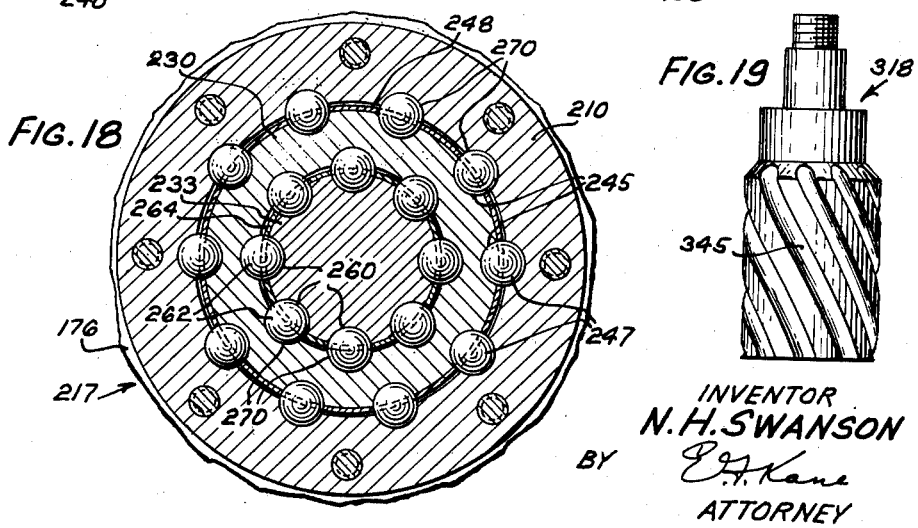
INVENTOR
N. H. SWANSON
BY
E. H. Kane
ATTORNEY Patented June 5, 1951

2,556,010

UNITED STATES PATENT OFFICE 2,556,010

INDEXING MECHANISM FOR TRANSLATING A RECIPROCATORY MOTION INTO A STEP-BY-STEP ROTARY MOTION

Nils H. Swanson, La Grange, Ill., assignor to Western Electric Company, Incorporated, New York, N. Y., a corporation of New York Application February 8, 1949, Serial No. 75,222

20 Claims. (Cl. 74—88)

This invention relates to indexing mechanisms and more particularly to actuating mechanisms for translating a reciprocatory motion into a step by step rotary motion.

It is an object of this invention to provide an improved actuating device of simple construction for translating a reciprocatory motion in one direction into a step by step motion in another direction.

This indexing mechanism, as applied to a rotary feed table on a punch press, has an annular driven member secured to the feed table and mounted for rotation about its axis and has a non-rotatable driving member telescopingly mounted within the annular driven member and connected to the ram of the press for reciprocation therewith along the axis of the rotatable member. The driving member has a helical cam track formed thereon which, as the driving member reciprocates, imparts an oscillatory movement to a cooperating follower which, in turn, is mounted for movement relative to the cam track and also for movement through a predetermined distance axially with the cam track and is yieldingly held in position thereon by a retainer member slidably mounted on the driving member. In response to the movement of the driving member in one direction, the follower is caused to move axially into one of an annular row of axially directed driving recesses having end walls for limiting the axial movement of the follower in one direction and having side walls forming abutments to establish a driving connection with the follower, and as the driving member continues its movement in said one direction, the helical cam track causes the follower and the driven member operatively connected thereto to be rotated through a predetermined arc about the axis of the driven member. The follower, in response to the axial movement of the driving member in the opposite direction, is caused to first move out of the driving recesses into engagement with an annular shoulder formed on the driven member, which shoulder limits the axial movement of the follower in the opposite direction and, as the driving member continues its movement, the helical cam track causes the follower to rotate in a reverse direction about the axis of the driven member while disconnected from the driven member, the follower being moved to its initial starting position on the cam track and in alignment with the next adjacent driving recess of the driven member.

The indexing mechanism may be applied to a rotary feed table and arranged to index the feed table in response to the down-stroke of the press or it may be arranged to index the feed table in response to the up-stroke of the press. Individual units of indexing mechanisms may be applied to each of a pair of feed tables geared together and arranged to cooperate to index the feed tables one step on the down-stroke of the press and one step on the up-stroke of the press.

In another embodiment of the invention, the indexing mechanism, comprising two units arranged in tandem to sequentially actuate a single feed table, is constructed so that one unit is operative to effect the indexing movement of the feed table one step on the down-stroke of the press and the other unit is operative to effect the indexing movement of the feed table another step on the up-stroke of the press.

In a further embodiment of the invention, the indexing mechanism comprises two units arranged in telescoping relation for simultaneous actuation to index the driven member and the feed table once on the up-stroke of the press while remaining idle on the down-stroke. One unit of the indexing mechanism is operable to impart a step by step rotary movement to an annular driving member telescopingly arranged about a stationary post and mounted for reciprocation along its axis, and the second unit of the indexing mechanism is operable to impart a step by step rotary movement of the driven member relative to the driving member. In order to effect a small indexing movement of the feed table or driven member, one unit of the indexing mechanism may be arranged to rotate the driving member through a predetermined arcuate distance in one direction and simultaneously therewith the second unit of the indexing mechanism may be arranged to rotate the driven member in the opposite direction through a greater or lesser distance than that of said first unit, resulting in an effective or net indexing movement of the driven member which is the difference between the rotary movements of the two units. In order to obtain a relatively large indexing movement of the driven member for one stroke of the press, the two units of the indexing mechanism may be arranged to drive in the same direction and cause the rotation of the driving member relative to the post in one direction and the rotation of a driven member relative to the driving member in the same direction, thereby effecting the compounding of the movements of the two units and the rotation of the driven member and the feed table through a relatively large arcuate distance.

Other objects, advantages and features of construction of the invention will be apparent by reference to the following detailed description and the accompanying drawings illustrating several embodiments of the invention wherein Fig. 1 is a plan sectional view of a punch press having a pair of rotary feed tables geared together for simultaneous operation in opposite directions and showing an indexing mechanism forming one embodiment of the present invention applied to each feed table;

Fig. 2 is a fragmentary vertical sectional view taken on the line 2—2 of Fig. 1 showing the two rotary feed tables on the punch press and the indexing mechanisms for actuating the feed tables and showing the ram of the press and the mechanism attached thereto, including the driving members of the indexing mechanisms, in their upper or raised positions;

Fig. 3 is an enlarged fragmentary vertical sectional view of the indexing mechanism and a portion of the press shown on the left-hand side in Fig. 2 and showing the driving member thereof in its down or lower position;

Figs. 4 and 5 are detailed horizontal sectional views of the indexing mechanisms taken on the lines 4—4 and 5—5, respectively, of Fig. 3;

Fig. 6 is a fragmentary detailed, sectional, elevational view of a portion of the driven member of the indexing mechanism shown in Fig. 3 to more clearly illustrate the annular idling groove and the axially directed driving grooves therein;

Fig. 7 is a fragmentary vertical sectional view, similar to Fig. 3, of the other indexing mechanism shown on the right-hand side of Fig. 2 and showing the driving member in its lower position;

Fig. 8 is a fragmentary detailed sectional view, similar to Fig. 6, showing a portion of the driving member of the indexing mechanism shown in Fig. 7 to more clearly illustrate the relationship between the idling and the driving grooves therein;

Fig. 9 is a vertical sectional view through a portion of a punch press and the rotary feed table therefor and showing a modified embodiment of the indexing mechanism therefor, the press and the driving member of the indexing mechanism being shown in upper position;

Fig. 10 is a fragmentary vertical sectional view of the indexing mechanism shown in Fig. 9, with the driving member in its lower position;

Figs. 11 and 12 are detailed horizontal sectional views taken on the lines 11—11 and 12—12, respectively, of Fig. 10;

Fig. 13 is a detailed fragmentary sectional elevational view of a portion of the driven member of the indexing mechanism shown in Fig. 10;

Fig. 14 is a fragmentary vertical sectional view of a punch press having a rotary feed table and showing a still further modified form of indexing mechanism therefor, the ram of the press and the driving member of the indexing mechanism being shown in their upper positions;

Fig. 15 is a fragmentary sectional elevational view of the driven member showing the driving and the idling grooves therein;

Fig. 16 is a sectional elevational view of a portion of the driving member showing the driving and driven grooves therein;

Fig. 17 is a vertical sectional view, similar to Fig. 14, showing the ram of the press and the parts carried thereby in their lower position;

Fig. 18 is a plan sectional view taken on the line 18—18 of Fig. 14; and

Fig. 19 is a reduced side elevational view of a driving member like that shown in Fig. 14, but having left-hand helical cam grooves therein.

Referring to Figs. 1 to 8 of the drawings, wherein one embodiment of the invention is disclosed, the indexing mechanism is shown as applied to each of a pair of turret dials or rotary feed tables for use in feeding parts to be processed between a set of cooperating relatively movable punches and dies in a punch press. As shown herein, a pair of circular feed tables 25 and 26 are provided at their periphery with teeth 27 forming gears which mesh with each other to cause the tables 25 and 26 to rotate together in opposite directions about their respective axes. Indexing devices 30 and 31 are provided for actuating the rotary tables 25 and 26, respectively, the indexing device 30 operating to index the feed tables on the up-stroke of the press and the indexing device 31 operating to index the feed tables on the down-stroke of the press. The construction of the two feed tables and the indexing devices therefor are substantially alike and only one will be described in detail, the same numbers applying to similar parts of each mechanism. Each feed table has a flat disc or web 34 extending horizontally inwardly from the peripheral gear portion and an annular hub member 36 secured thereto. The hub member 36 has an inner cylindrical surface 37 and an outer conical bearing surface 38 and is rotatably supported in a conforming bearing surface 39 in a supporting block 40. A washer 42, slidably engaging the lower surface of the supporting block 40, in cooperation with lock nuts 43 threadedly secured on the cylindrical lower end of the hub member 36, serves to retain the hub 36 and the rotary table on the block 40. The supporting blocks 40 are mounted on a bolster plate 45 which, in turn, is suitably secured to the bed 46 of the punch press. Thus, it will be apparent that the feed tables are mounted for rotary movement about their individual axes, but are held against axial or vertical movement.

The feed table and the hub member 36 associated therewith constitute the driven member 47 of the indexing device which is actuated by a driving member 48 in the form of a cylindrical element telescopingly positioned within the hub 36 and connected at its upper end to a punch holder 50. The punch holder 50 is attached by an upwardly extending shank 51 to the ram 52 of the punch press for reciprocation therewith and serves to reciprocate the driving members 48 relative to the driven members 47.

The feed tables 25 and 26 are adapted to receive and feed a plurality of U-shaped piece parts 60 into predetermined positions between sets of movable punches 62 mounted on the punch holder 50 and a stationary die 63 secured to the bolster plate 45 and engaging the underneath surface of a portion of the feed tables 25 and 26. Eight equally spaced part-receiving apertures 65 are provided in each feed table and the apertures are adapted to be successively positioned under a stack of piece parts placed in a gravity-feed loading device 68 (Figs. 1 and 2). The loading device comprises a plate 69 secured by cap screws 70 to a supporting plate 71 mounted on the block 40 and engaging the underneath side of a portion of the feed table. The plate 69 of the loading device is provided with a pair of upstanding guide members 72, 73 for maintaining the piece parts in a vertically aligned stack, and with an aperture 74 conforming to the shape of the piece part to allow the parts 60 to pass through the plate into the apertures 65 in the feed table. The lowermost one of the stack of piece parts 60 is received in the aperture 65 of the feed table as the feed table comes to rest after each indexing movement and as it is fed from the stack, the part 60 is supported on the upper surface of the plate 71 and the die 63.

As the feed table is indexed two steps for one cycle of reciprocation of the actuator, two piece parts are fed between the punch and die set, one into position No. 2 and one into position No. 3 (Fig. 1), and, upon the next cycle of reciprocation of the ram, these two piece parts are advanced to stations Nos. 4 and 5 and two other piece parts are received from the supply in the loading device 68 and fed to stations Nos. 2 and 3. Thus, it will be seen that in the apparatus disclosed in Figs. 1 and 2, two new piece parts are fed by each feed table between one section of the punch and die set for receiving one processing operation and simultaneously therewith the two preceding piece parts are fed to another section of the punch and die set for receiving a second processing operation. The piece parts are successively unloaded from the feed table as they pass station No. 7, where they fall through an opening 77 in the plate 71 into an inclined discharge groove 78 formed in the block 40.

The driving member 48 (Figs. 2 and 3) has an enlarged cylindrical head 80 adapted to reciprocate within the bore of the hub 36 and having its outer cylindrical surface in close proximity to the inner cylindrical surface 37 of the hub 36. Formed on the head 80 are eight (8) equally spaced cams or cam tracks 81 in the form of grooves having semi-circular cross-sections. The cam tracks 81 have straight upper portions arranged parallel with the axis of the driven member 48 and lower sloping or helical portions and are adapted to receive portions of followers 82 therein. The followers 82, in the form of spherical metal rollers, engage in apertures 83 in an annular retaining member 84, which serves to maintain the followers 82 in horizontal alignment. Made of spring steel, and spaced from the hub surface 36, the annular retaining member 84 is slightly deformed from its circular cross-section so as to frictionally engage the outer surface of the head 80 at various points and thus serves to yieldably hold the followers 82 in the cam tracks 81 for vertical movement with the driving member 48 through a predetermined distance and permits relative movement between the cam track and the followers.

Other portions of the followers 82 are adapted to ride in a plurality of equally spaced driving grooves, recesses or pockets 86 arranged in an annular row on the inner portion of the hub 36. The pockets 86, at one end thereof, have walls 87 forming stop shoulders engageable with the followers 82 for limiting the axial movement thereof in one direction and, at their opposite ends, the pockets 86 communicate with an annular idling groove 88 having a semi-circular cross-section and an annular shoulder 89 forming a stop to limit the axial movement of the followers 82 in the opposite direction. The pockets 86 form an annular row of inwardly directed shoulders or abutments 90, which engage the lateral portions of the followers 82 when the followers are positioned in the pockets 86. In the indexing mechanism 30, the pockets 86 (Fig. 6) extend upwardly from the annular idling groove 88, whereas, in the indexing mechanism 31, the pockets 86 (Fig. 8) extend downwardly from the annular idling grooves 88. In order to facilitate the forming of the grooves 86 and 88 in the hub member 36, the hub member is preferably made in two parts, a lower part 36—1 and an upper part 36—2, secured together by a plurality of cap screws 92 and having a parting surface which, in the indexing mechanism 30, intersects the pockets 86 and which, in the indexing mechanism 31, intersects the idling groove 88. A cup-shaped cap or dust guard 94 is secured to the upper portion of the hub 36 by a plurality of cap screws 95, which also serve to secure the plate 34 of the feed tables to the hub 36.

From the description thus far, it will be seen that the head 80 of the driving member 48 is reciprocable within the bore of the driven member and has a cam track with a helical portion which cooperates with a follower 82 and, in response to a downward movement relative to the follower, imparts a rotary movement through a predetermined distance in a clockwise direction, as viewed from above, and, in response to an upward movement of the head relative to the follower 82, imparts a return rotary movement to the follower in a counter-clockwise direction; that the follower has an anular idling groove and an annular row of axially directed driving recesses or pockets communicating therewith for receiving portions of the followers 82 therein; that the driven member is provided with shoulder means 87 and 89 limiting the axial movement of the followers 82 to and from a position in the driving pockets 86 to and from a position out of engagement with the driving pockets; that the retainer member 84, which is frictionally and slidably mounted on the driving head 80, serves to retain the followers 82 on the head 80 for a predetermined axial movement therewith while permitting movement of the followers relative to the cam tracks 81 of the head 80.

The pockets 86 form an annular row of driving shoulders or abutments 90 for engagement with the lateral portions of the followers 82 so that, when the followers are moved into engagement with the pockets 86, they form connector elements which, in cooperation with the abutments 90 and the cam tracks 81, serve to establish a driving connection between the driving and the driven members. As the driving member 48 moves axially in one direction, the followers 82, with the aid of the retaining member 84, are moved axially therewith into the pockets 86 of the driven member and into engagement with the shoulders 87 thereof, where the axial movement of the followers is arrested. Continued movement in that direction of the driving member 48 produces a movement of the head 80 relative to the followers and causes the helical portions of the cams 81 to impart a rotary movement to the followers and the driven member operatively connected thereto through one step of indexing movement. The straight portions of the cams 81 cooperate with the followers 82 and the abutments 90 of the driven member 47 to hold the driven member against rotation while the driving member 48 continues its axial movement for a short distance and while the punches 62 are moved into engagement with the piece parts 60 aligned therewith.

As the driving member 48 is moved in the opposite direction, the head 80 thereon, in cooperation with the retaining member 84, carries the followers 82 axially with the driving member out of the pockets 86 and into the annular idling groove 88, where the shoulder 89 arrests the axial movement of the followers 82. The helical portion of the cam 81, as the driving member 48 continues its movement, imparts a rotary movement in the reverse direction to the followers 82 through 1/8 of a revolution, but since the followers are positioned in the idling groove 88, no movement is imparted to the driven member. The followers are thus positioned in alignment with the next adjacent driving grooves 86 so that, on each successive cycle of reciprocation of the driving member 48, the followers 82 will engage in successive ones of the annular row of driving grooves and cause the indexing of the driven member through successive steps.

While the same number (eight) of cam tracks 81 and the same number (eight) of followers 82 as there are driving recesses or pockets 86 has been illustrated as a preferred construction, it will be understood that one cam track 81 and one follower 82 is sufficient to form an operable device.

In order to better understand the operation of the indexing devices 30—31 alternately to index the feed tables 25 and 26 one step on the downstroke and one on the up-stroke of the ram of the press, a detailed description of the operation will now be given.

Assuming the ram 52 to be in its upper position, as shown in Fig. 2, with the followers 82 in their upper position in engagement with the shoulders 89 and 87 in the indexing mechanisms 31 and 30, respectively, as the press is actuated and the ram 52 and the driving members 48 move downwardly, the followers 82, in the indexing mechanism 31 are carried by the head 80 and the retainer 84 from the idling groove 88 into the driving grooves 86 and into engagement with the shoulders 87 therein, while the followers 82 in the mechanism 30 are carried by the head 80 and the retainer 84 from the driving grooves 86 into the idling groove 88 and into engagement with the stop shoulder 89 thereof. As the ram 52 continues its downward movement, the driving members 48 will move downwardly therewith relative to the followers and the helical portions of the cams 81 will impart a rotary movement in a clockwise direction, as viewed from above, to the followers 82 through 1/8 of a revolution. The followers 82 in the mechanism 30, at that time being positioned in an idling groove 88, no indexing movement is imparted to the driven member by the followers, whereas, in the mechanism 31, with the followers 82 positioned in the pockets 86 and in engagement with the abutments 90, the rotary movements imparted to the followers 82 are transferred to the abutments and serve to rotate the driven member through 1/8 of a revolution in a clockwise direction as viewed from above, thereby indexing the feed table 26, which simultaneously indexes the feed table 25. As the feed tables and the driven members come to rest on completion of the indexing movement, the followers 82 enter the straight upper portions of the cam tracks 81 and serve to lock the driven members against rotation while the driving members 48 continue the remainder of their downward movement with the ram 52 and, while the punches 62 are brought into engagement with the parts 60 in alignment therewith. On the up-stroke of the ram, during the first portion thereof, as the punches 62 are moving away from the parts 60, the heads 80 on the driving members 48, in cooperation with the retaining members 84, carry the followers 82 upwardly therewith until the followers 82 engage the stop shoulders 87 and 89, respectively, in the indexing mechanisms 30 and 31. Continued movement of the ram will cause the driving members 48 to move relative to the followers and, as the followers enter the helical portions of the cams 81, they will be rotated in a reverse direction counter-clockwise, as viewed from above, through 1/8 of a revolution to their original starting position, as illustrated in Fig. 2. In the indexing mechanism 31, the followers 82 being positioned in the idling groove 88, no rotation is imparted to the driven member by the followers 82, whereas, in the indexing mechanism 30, the followers 82, being positioned in the pockets 86 in engagement with the abutments 90, the rotary movement of the followers 82 in a reverse direction is imparted to the driven member to cause the indexing of the feed table 25, which simultaneously indexes the feed table 26.

From the foregoing description of the arrangement illustrated in Figs. 1 to 8, it will be seen that the indexing mechanisms 30 and 31 operate to index the feed tables 25 and 26 twice during each cycle of reciprocation of the ram 52 of the press, the indexing mechansm 31 operating to index the tables one step on the downward stroke of the ram and the indexing mechanism 30 operating to index the feed tables one step on the up-stroke of the ram. This double-indexing during one cycle of operation of the press will accomplish the feeding of two parts on each feed table into the press and has the advantage of providing a dwell between indexing movements for the loading of each part, which period of dwell insures that the lowermost part in the stack at the feeding device 68 will enter the part-receiving aperture 65 to properly load the parts onto the feed table.

Although two indexing mechanisms in the above-disclosed apparatus have been shown arranged to index a pair of feed tables two steps for each cycle of reciprocation of the press, it will be understood that a single rotary feed table may be employed to feed parts step by step into a punch press and be actuated by a single indexing mechanism to index the table one step for each cycle of reciprocation of the press, either on the down-stroke or on the up-stroke of the press.

The invention, in another embodiment, contemplates an indexing mechanism having, in effect, a double unit arranged in tandem and actuated by a single driving member for indexing a single driven member or feed table, the indexing mechanism being operable to index the driven mechanism one step in response to movement of the driving member in one direction and to index the driven member a second step in response to the movement of the driving member in the opposite direction. As embodied in the apparatus illustrated in Figs. 9 to 13, an indexing device 100 is provided for indexing a rotary feed table 102 twice during each cycle of reciprocation of the ram of the punch press for feeding parts 104 between the set of relatively movable punch and dies 106 and 108, respectively. The die 108 is mounted on a bolster plate 109, which is secured to the bed 110 of the punch press. The punches 106, only one of which is illustrated in Fig. 9, are attached to punch holder 114 having an upwardly extending shank 115, by means of which it is secured to the ram 116 of the press for reciprocation therewith.

The indexing mechanism 100 comprises a reciprocable cylindrical driving member 120, secured at its upper end to the punch 114, for reciprocation therewith, and having an enlarged elongated cylindrical head 121 telescopingly mounted in the bore of a rotatable driven member 122. The driven member 122 comprises the rotary feed table 102, in the form of an annular disc, and a composite hub member 124, secured to the inner portion of the annular disc by cap screws 126, which also secure a centrally apertured cup-shaped dust cap 128 to the driven member. The hub member 124 has an inner cylindrical surface 130 forming the bore of the driven member and a conical outer bearing surface 131 and is adapted to be rotatably supported in a conforming conical surface 132 formed in a bearing block 135, which, in turn, is rigidly secured to the bolster 109. A thrust washer 136, slidably engaging a portion of the underneath surface of the bearing block 135, is secured on the lower end of the hub member 124 by a pair of lock nuts 137 threadedly engaging the exteriorly threaded portion 138 of the lower end of the hub member 124 and serves to retain the driven member 122 against upward movement.

The head 121 of the driving member is provided with eight (8) equally spaced cam tracks 142, in the form of grooves semi-circular in cross-section extending longitudinally of the head. The groves 142 comprise an uper straight portion 143 parallel with the axis of the head which connect, at their lower ends, with a right-hand sloping or helical portion 144 extending angularly through ⅛ of a revolution about the axis of the head and which, at their lower end, continue vertically for a relatively short distance and then continue downwardly in a left-hand sloping direction to form right-hand helical portions 146, which extend angularly through ⅛ of a revolution about the axis of the head 121. Two sets of followers or connector members 148 and 150, in the form of spherical metal rollers, are adapted to engage the cam tracks in axially spaced relation relative to each other, as indicated in Figs. 9 and 10. Annular retaining members 152 and 154, having apertures for receiving the followers 148 and 150, respectively, are slidably mounted on the head 121 in spaced relation to the cylindrical surface 130 of the driven member 122 and serve to maintain the follower members in horizontal alignment. The retaining members 152 and 154 are slightly bent from a true circular cross-section to frictionally engage the outer cylindrical surface of the head 121 at various points and to yieldably maintain said followers on the head for limited axial movement therewith. The outer portions of the followers 148 and 150 extend radially outwardly beyond the retainer members 152 and 154 and into upper and lower sets of grooves, respectively, formed in the hub portion 124 of the driven member 122. The upper set of grooves in the driven member comprises an idling groove 160 having an upper shoulder 161 engageable with the followers 148 to limit their movement upwardly, and a plurality of axially extending short driving grooves or pockets 162 having lower end walls or shoulders 163 engageable with the followers 148 to limit their movement axially in the opposite or downward direction and forming an annular row of equally spaced shoulders or abutments 164 therebetween. The lower set of grooves in the hub portion of the driving member 122, likewise, comprises an annular idling groove 167 having a shoulder 168 engageable with the followers 150 to limit their downward movement, and a plurality of short grooves or pockets 169 extending axially upwardly therefrom and having end walls or shoulders 170 engageable with the followers 150 to limit their upward movement. The pockets 169 form an annular row of abutments 171, which, when the followers 150 are moved into the pockets 169, engage lateral portions of the followers and, in cooperation therewith, form a driving connection between the cam tracks on the driving member and the driven member. In like manner, the annular row of abutments 164 engage lateral portions of the followers 148 when the followers are moved into the pockets 162 and in cooperation with the followers and the cam tracks 142 serve to establish a driving connection between the driving member 120 and the driven member 122.

In order to facilitate the machining of the upper and lower follower-receiving grooves in the bore of the driven member 122, the composite hub member 124 is made from three component parts—an upper part 124—1 secured to the intermediate portion 124—2 by a plurality of cap screws 175 and having meeting surfaces intersecting the idling groove 160, and a lower member 124—3 threadedly engaging the lower internally threaded end portion of the body portion 124—1 and having a meeting surface intersecting the idling groove 167.

As the driving member 120 moves axially relative to the driven member, the retainer members 152 and 154, frictionally engaging the head 121, serve to support the followers for axial movement with the head until the followers engage the stop shoulders in the driven member, after which the driving member continues its axial movement and the cam tracks 142 are caused to move relative to the followers 148 and 150 and impart rotary movements to the followers 148 and 150 in opposite directions of rotation through angular distances of ⅛ of a revolution. It will be noted that the followers 148 and 150 are simultaneously moved upwardly together and downwardly together so that when, in response to axial movement of the cam grooves relative to the followers, a consequent rotative movement is imparted to the followers, one set of followers will be positioned in one of the idling grooves in the driven member while the other set of followers will be positioned in the driving pockets and in driving engagement with the abutments therebetween and will impart the same rotary movement to the driven member as the helical portion of the cam imparts to it.

The operation of the indexing mechanism through one cycle of reciprocation of the ram 116 of the press is as follows: Assuming that the ram is in its normal upper position, as shown in Fig. 9, and with the followers 148 and 150 in their upward position in engagement with the stop shoulders 161, of the idling groove 160, and 170, of the pockets 169, respectively, upon actuation of the press and downward movement of the driving member 120, the retainer members 152 and 154 will serve to carry the followers 148 and 150 downwardly with the driving member 120. The followers 148 will thus be moved from the idling groove 160 into the driving pockets 162 and then into engagement with the shoulders 163, which will arrest the downward movement of the followers 148 and simultaneously therewith the followers 150 will move downwardly from the driving pockets 169 into the idling groove 167 and into engagement with the shoulder 168, which will arrest the downward movement of the followers 150. As the driving member 120 continues its downward movement, the cam tracks 142 are caused to move relative to the followers and the helical portions 146 will impart a rotary movement to the followers 150 through ⅛ of a revolution in a counter-clockwise direction, as viewed from above, but since the followers 150 are positioned in the idler groove 167, no movement will be imparted thereby to the driven member 122. Simultaneously with the counter-clockwise movement of the followers 150, the helical portions 144 of the cam tracks will impart a clockwise movement to the followers 148 through ⅛ of a revolution and since the followers at this time are in the driving pockets 162 and in engagement with the abutments 164 therebetween, this rotary movement will be imparted to the driven member 122 and the feed table 102 will thus be indexed one step in a clockwise direction and the parts of the indexing mechanism will be in a position indicated in Fig. 10. The helical portions 144 and 146 each extend through an angular distance of ⅛ of a revolution, but the helical portion 144 has a steeper slope than that of the helical portion 146 so that the helical portion 144 will complete the imparting of the rotary movement to the followers 148 in a distance less than the length of the stroke of the ram, thus allowing for the completion of the indexing movement of the table on the down-stroke of the ram before the punch 106 engages the piece part 104. During the latter portion of the downward movement of the ram of the press, the followers 148 ride in the straight portions 143 of the cam tracks 142 and serve to lock the driven member 122 and the feed table 102 against rotary movement while the punch 106 engages the piece part 104.

On the up-stroke of the ram, the punch 106 and the driving member 120 will move upwardly therewith and the retaining members 152 and 154 will serve to move the followers 148 and 150, respectively, upwardly with the head 121 until the separate movements of the followers are arrested by the engagement of the followers with the stop shoulders 161 and 170 in the driven member 122, after which the driving member 120 continues its upward movement and the helical portions of the cams impart rotary movements to the followers in opposite directions to restore the followers to their original position shown in Fig. 9. Thus, the followers 148, during the upward movement of the driving member 120, are moved from the driving pockets 162 into the annular idling groove 169 and are rotated in a counter-clockwise direction by the relative movement of the helical portion 144 of the cam track 142 without imparting this rotary movement to the driven member 122. The followers 150, during the upward movement of the driving member 120, are moved from the annular idling groove 167 into the driving pockets 169 and are rotated through ⅛ of a revolution by the helical portion 146 of the cam track 142 and impart this rotary movement to the driven member 122, thereby indexing the feed table 102 another step in a clockwise direction.

In each of the two embodiments of the invention so far described, the number of driving recesses in the driven member and the number of followers and cam tracks cooperating therewith for actuating the driving member are equal to the number of increments or steps required for indexing the driven member through one complete revolution. In still another embodiment of the invention, the number of driving recesses in the driven member may be more or less than the number of steps of indexing movement required to index the driven member through one complete revolution, depending upon whether a relatively large number of increments or a relatively small number of increments for each revolution of the driven member is desired. The indexing mechanism in this embodiment makes use of two units mounted in telescoping relation to each other for simultaneous operation to index the driven member or feed table one step for each movement in one direction of a reciprocable driving member. In one arrangement of the indexing mechanism, and in response to the upward movement of the driving member, one unit is adapted to be rotated through a predetermined distance in one direction and simultaneously therewith the second member is adapted to be rotated through a different distance from that of the first unit in a reverse direction to effect a net indexing movement of the driven member equal to the difference between the individual rotary movements of each unit in opposite directions. With this arrangement, the indexing movement may be relatively short. In another arrangement of this embodiment of the indexing mechanism, one unit is adapted to be rotated through a predetermined distance in one direction on the up-stroke of the driving member and, simultaneously therewith, the second unit is adapted to be rotated through a predetermined distance in the same direction to effect a relatively large indexing movement of the driven member, equal to the sum of both indexing movements of the two units of the indexing mechanism. In this embodiment of the invention, as shown in Figs. 14 and 19, the indexing mechanism 175 indexes a feed table 176 step by step to feed piece parts 177 between a set of cooperative, relatively movable punch and dies 187 and 188, respectively, of a punch press. The die 188 is mounted on a bolster plate 189, which is suitably secured to a bed 190 of the punch press, and the punch 187 is secured to punch holder 205, which has an upwardly extending shank 206, by means of which the punch holder is secured to the ram 207 of the punch press for reciprocation therewith. Secured to the feed table 176 is a composite hub member 210, which has an inner cylindrical bore 211 and an outer conical bearing surface 212, and is journalled in a conical bearing surface 213 in a supporting block 214, which, in turn, is mounted on the bolster plate 189. The lower end of the hub member 210, which extends below the supporting block 214, is externally threaded and has a pair of lock nuts 215 and a washer 216 mounted thereon for rotatably securing the hub 210 in the block 214.

The feed table 176 and the composite hub 210 secured thereto constitute the driven member 217, in the bore 211 of which is telescopingly disposed a driving member 218 rotatably secured at its upper end to the punch holder 205 for reciprocation therewith and having an annular or hollow cylindrical head 219 at its lower end. A reduced shank 221 at the upper end of the member 218, fitting in a cylindrical aperture 222 in the punch holder, guides the driving member for rotation about the axis of the driven member 217 and a shoulder 223 on the member 218 and a washer 224, clamped to the shank 221 by a nut 225, engaging a reduced threaded end 226 of the shank, serve to rotatably secure the driving member 218 to the punch holder 205. The annular head 219 of the driving member 218 has an outer cylindrical surface 230 coaxial with and in close proximity to the inner surface 211 of the hub 210 and has an inner coaxial cylindrical surface 231. Telescopingly disposed within the annular head 219 is a stationary post 233 having an outer cylindrical surface coaxial with and in close proximity to the cylindrical surface 231 of the driving member 218. The lower end of the post 233, which has an enlarged head 234, is positioned in a conforming aperture in the bolster plate 189 and may be secured therein against rotation by any suitable means. As a safety feature, the post 233 may be yieldably mounted to rotate in response to a predetermined excessive torque applied thereto. As shown in Figs. 14 and 17, a locking pin 236, having a conical end engageable in a conical recess in the head 234 of the post, is mounted in a bore 239 in the bolster plate 189 and is urged into locking engagement with the post 233 by a spring 240 retained in the bore by a plug 241.

On its outer surface, the annular driving head 219 is provided with ten equally spaced cams or cam tracks 245 in the form of grooves having semi-circular cross-sections and sloped to form right-hand helixes. Portions of followers or connector members 247, in the form of spherical metal rollers, fit into the cam tracks 245 and are maintained in horizontal position by an annular retaining member 248 slidably engaging the cylindrical surface 230 of the driving member 218 and provided with apertures for receiving the followers. The retaining member 248, which is spaced from the cylindrical surface 211 of the hub member, is deformed from a circular cross section to frictionally engage the outer surface 230 of the driving member 218 and act to yieldably support the followers 247 for limited axial movement with the driving member 218 and allow relative movement between the driving member 218 and the followers 247. The outer portions of the followers 247 extend radially outwardly beyond the retainer member 248 and fit into a set of grooves in the hub member 210. This set of grooves in the hub member comprises an annular idling groove 250 having a shoulder 251 adapted to engage the followers 247 and limit their axial movement downwardly and a plurality of spaced relatively short axially disposed driving grooves or pockets 252 extending upwardly from the idling groove and having end walls or shoulders 253 engageable with the followers 247 for limiting the axial movement thereof in an upward direction. The pockets 252 form an annular row of inwardly directed and axially disposed shoulders or abutments 254, adapted to engage the lateral portions of the followers 247 when the followers are positioned in the driving grooves 252 and, in cooperation with the followers and cam track, serve to establish a driving connection between the driven and driving members for the transmission of lateral or rotary forces.

In order to facilitate the machining of the sets of grooves 250 and 252 in the driven member 216, the hub portion 210 thereof is formed as a composite structure having an upper member 210—1 secured to the lower member 210—2 by a plurality of cap screws 257 and having a meeting surface intersecting the idling groove 250.

The post 233 is provided with a plurality of equally spaced helical cams or cam tracks 260 in the form of grooves having semi-circular cross section for receiving portions of followers 262 therein in the form of metal spherical rollers. The followers are maintained in horizontal alignment in the cam tracks 260 by an annular retaining member 264, apertured to receive the followers and mounted for sliding movement on the post 232 and in spaced relation to the inner cylindrical wall 231 of the driving member 218. The retaining member 264 is slightly deformed from its circular shape to frictionally engage the outer cylindrical surface of the post 233 at various points and serves to yieldably maintain the followers 262 in position thereon. The outer portions of the followers 262, extending radially outwardly beyond the retainer member 264, fit into a set of grooves formed on the inner surface of the annular driving member 218 and which comprises an annular idling groove 268 and a plurality of equally spaced axially disposed driving grooves or pockets 270 extending downwardly from the idling groove (Fig. 16). The shoulder 271 on the idling groove 268 is adapted to engage the followers 262 as the driving member 218 moves downwardly and move the followers downwardly with the driving member. When the driving member 218 moves upwardly, shoulders 272, forming the end walls of the pockets 270, are adapted to engage the followers 262 and move them upwardly with the driving member 218. An annular row of inwardly directed axially disposed driving shoulders or abutments 273 is formed by the driving pockets 270 and engages the lateral portion of the followers 262, and, when the followers are positioned in the driving pockets 270 and in cooperation with the followers and the cam tracks on the post 233, form an interlocking or driving connection between the post and the driving member 218 for the transmission of lateral or rotary forces between the post and the driving member.

In order to aid in the forming of the grooves 268 and 270 in the driving member, the driving member is made as a composite structure and has a separate annular component sleeve part 230—1 secured in the lower recessed portion of the driving member and having meeting surfaces intersecting the idling groove 268. As the ram of the press descends, the driving member 218 moves downwardly therewith and the followers or connector elements 262 are caused to move downwardly along the spiral cam tracks 260 in the stationary post 233 and the cam tracks 245 in the driving member 218 move relative to the followers or connectors 247. As a result of the relative movement between the followers 247 and 262 and their cooperating cam tracks 245 and 260, respectively, rotation is imparted to the sets of followers 247 and 262 through predetermined arcs about the axis of the indexing device. On the up-stroke of the ram, the driving member 218 moves upwardly therewith and a corresponding rotary movement is imparted to the followers 247 and 262 in a reverse direction to return the followers to their original starting position. In the construction of the indexing apparatus illustrated in Figs. 14 to 18, there are eight (8) cam tracks 260 and eight (8) driving pockets 270 formed in the stationary post 233 and the driving member 218, respectively, with a set of eight (8) followers or connector members 262 cooperating therewith to establish and dis-establish a driving connection between the post 233 and the driving member 218 and there are ten (10) helical cam tracks 245 and ten (10) driving pockets 252 in the driving member 218 and the hub of the driven member 216, respectively, and ten (10) followers or connector members 247 associated therewith for establishing and dis-establishing a driving connection between the driven member 216 and the driven member 217. The helical grooves 260 are arranged to impart a rotary movement to the followers 262 of ⅛ of a revolution about the post 233 in response to reciprocation of the driving member 218 and the helical cam tracks 245 arranged to impart an oscillation to the followers 247 through 1/10 of a revolution about the axis of the post 233 in response to the reciprocation of the driving member 218. The parts of the indexing mechanism, including the followers, the idling, and the driving grooves are so arranged as to establish a driving connection between the driving member and the post and the driven member on the up-stroke of the press and effect an indexing movement to the feed table 176. Thus, the indexing mechanism is inoperative on the down-stroke of the ram and the feed table 176 is idle or stationary while on the up-stroke of the ram the indexing mechanism is operative to cause the indexing of the feed table 176 one step.

A more detailed consideration of the operation of the indexing mechanism will show that with the parts in their normal upper position, as shown in Fig. 14, and upon actuation of the press and the downward movement of the ram 207, the driving member 218 will move downwardly and the retainer 248 on the driving member will cause the followers 247 to move downwardly with the driving member and be moved from the driving pockets 252 into the annular idling grooves 259 of the driven member 216 and into engagement with the shoulder 251, which arrests the downward movement thereof. During this portion of the downward movement of the driving member 218, the retainer 264 retains the followers 262 in fixed position on the post 232 while the annular head moves downwardly relative thereto and causes displacement of the followers 262 from the driving pockets 270 and into the idling groove 268 and into engagement with the shoulder 271. Continued movement of the ram and the driving member 218 causes a downward movement of the cam tracks relative to the follower 247 and a simultaneous movement downwardly of the followers 262 along and relative to the cam tracks 260. The downward movement of the cam track relative to the followers 247 and of the followers 262 relative to the cam track 260 will impart a rotary movement to the followers 262 relative to the post in a clockwise direction as viewed from above and will impart a rotary movement of the followers 247 relative to the driving member 218 in a counter-clockwise direction, as viewed from above, but since the followers 262 and 247 are then aligned with the idling grooves 268 and 259, respectively, no rotation will be imparted from one member to the other and the driven member 216 and the feed table 176 will remain idle.

On the up-stroke of the ram, from its lowermost position, as shown in Fig. 17, the driving member 218 moves upwardly therewith and the retainer member 248 causes the followers 247 to move upwardly with the driving member and be moved from the idling groove 250 into the driving pockets 252 of the driven member 216 and into engagement with the shoulders 253, which limit the upward movement of the followers. During this portion of the upward movement of the driving member 218, and while the retainer member 264 maintains the followers 262 in their lowermost position, the followers 262 are displaced from the driving pockets 252 and are aligned with the idling groove 250 and are engaged by the shoulder 251 of the annular head of the driving member. As the ram and the driving member continue their movement upwardly, the cam tracks 245 will be caused to move upwardly relative to the followers 247 and impart a rotary movement thereto and the followers 262 will be moved upwardly along and relative to the cam tracks 260 and will be rotated thereby about the axis of the post 233. The upward movement of the cam tracks 245 relative to the followers 247 will impart a rotary movement to the followers 247 and the driven member 216 through 1/10 of a revolution in a clockwise direction as viewed from above relative to the driving member 218 and the movement of the followers 262 relative to the cam tracks 260 will cause a rotation of the followers 262 and the driving member 218 through ⅛ of a revolution in a counter-clockwise direction as viewed from above, resulting in an effective indexing movement of 1/40 of a revolution relative to the punch press. By varying the number of driving pockets in the driving member relative to the number of driving pockets in the driven member and the followers and cam tracks associated with each set of driving pockets, various lengths of indexing movements of the feed table may be obtained. Thus, it will be apparent that an indexing mechanism embodying this arrangement of construction may be made having a large number of short indexing movements for one complete revolution of the feed table.

In order to convert the indexing mechanism shown in Fig. 14, which produces relatively small steps or increments of indexing movement to one producing relatively large increments of indexing movement, the driving member 218 may be removed therefrom and a driving head 318 (Fig. 19) may be substituted therefor. The driving member 318 is identical in construction to that of the driving member 218 except that the helical cam tracks 345 are left-handed instead of right-handed, as on the member 218. Whereas the driving head 218 is rotated in one direction relative to the post 233 and serves to rotate the driven member 217 in the opposite direction, the driving member 318 is adapted to rotate the driven member 217 in the same direction as the driving member 318 is rotated when the driving member 318 is reciprocated. With this construction, then, during the up-stroke of each reciprocation of the ram of the press and the driving head 318, the driven member 216 will be indexed through a relatively large arcuate distance equal to the sum of the arcuate movements of the driving member relative to the stationary post 233 and the movement of the driven member 217 relative to the driving member 318.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In an indexing mechanism for intermittently rotating a member in one direction in response to a reciprocating movement of another member, the combination of a cylindrical member, an annular member arranged in telescoping relation with said cylindrical member, a plurality of equally spaced helical cam grooves in one of said members, grooves in the other member comprising an annular portion and equally spaced portions equal in number to said helical grooves extending axially from said annular portion, spherical rollers having portions thereof engageable in the grooves of each member, a retainer element disposed between said members and frictionally engaging said member with the cam grooves for yieldably retaining said rollers in said helical cam grooves, means mounting one of said members for reciprocation, and means mounting said other member for rotation whereby, when said one member is reciprocated, said other member will be rotated step by step in one direction.

2. A mechanism for converting a reciprocatory motion into a step by step rotary motion comprising a rotary member, means mounting said rotary member for rotation about an axis, a non-rotatable member, means for axially reciprocating said non-rotatable member through a predetermined distance, a helical cam on said non-rotatable member, a spherical cam follower movable along said cam, means yieldingly retaining said follower on said cam for axial movement with and for movement relative to said cam, a pair of axially spaced stop means on said rotatable member for limiting the axial movement of said follower with said cam during the axial reciprocations of said non-rotatable member to cause relative movement between the cam and the follower to effect the oscillation of said follower through a predetermined arc, and means on said rotatable member engageable with said follower during the axial movement of said follower in one direction for establishing a driving connection therewith to cause the rotatable member to be indexed from one position through said predetermined arc to another position and stopped in said latter position by said follower in response to said axial movement in said one direction of said non-rotatable member.

3. A mechanism for converting a reciprocatory motion in one direction into a step by step motion in another direction comprising a driving member, means for reciprocating said member through a predetermined distance, a cam on said driving member, a spherical cam follower, means yieldably retaining said follower for movement along and with said cam, said cam being disposed obliquely relative to the direction of reciprocation for imparting a predetermined lateral movement to said follower in response to relative movement between said follower and said cam, a driven member, means mounting said driven member for movement in a predetermined path, spaced stop means for limiting the movement of said follower with said cam during the reciprocatory movement thereof to cause a relative movement between the cam and the follower for effecting the lateral movement of said follower through a predetermined distance, and a plurality of spaced abutments on said driven member engageable with said follower during the movement of said follower in one direction with said driving member for establishing a driving connecton therewith to cause the driven member to be indexed from one position through said predetermined distance to another position and stopped in said latter position by said follower in response to said movement in said one direction of said driving member.

4. An intermittent feeding mechanism comprising a driven member having a cylindrical surface, means supporting said driven member for rotation about the axis of said cylindrical surface, a driving member having a cylindrical surface in telescoping arrangement with the cylindrical surface of said driven member, means for axially reciprocating said driving member, a helical cam groove formed in the cylindrical surface of one of said members, an annular groove formed in the cylindrical surface of the other of said members, a plurality of equally spaced axially directed relatively short grooves extending from said annular groove in the cylindrical surface of said other member, a spherical follower mounted in said helical cam groove of said one member and engageable alternately in said annular and said axially directed grooves in said other member, a retainer member frictionally engaging and slidably mounted on said member having said helical groove for yieldably holding said follower in said helical cam groove, the arrangement of parts being such that, in response to axial movement of said driving member in one direction, said follower is caused to move into one of said axially directed grooves to establish a driving connection between the follower and the driven member and effect the rotation of said driven member, and, in response to the movement of said driving member in the opposite direction, said follower is moved out of said axially directed groove into said annular groove to disconnect the driving engagement between the driving and driven members and cause the spherical follower to be moved into alignment with the next adjacent axially directed groove in said other member.

5. An indexing mechanism comprising a driven member having a bore, means mounting said driven member for rotary movement about the axis of said bore and against axial movement, a driving member having a cylindrical head telescopingly disposed within the bore of said driven member, means for axially reciprocating said driving member, a plurality of equally spaced helical cam grooves in said head, a spherical connector member in each of said cam grooves, a retainer member slidingly mounted on said head for holding said spherical connector members in said cam grooves and in transverse alignment with each other for movement with and relative to said head, said driven member having axially spaced shoulder portions engageable with said connector members for limiting the axial movement of said spherical connector members with said driving member to cause a relative movement between the connector members and the cam grooves to effect an oscillating movement of said connector members through a predetermined distance in response to the reciprocations of said driving member, and an annular row of regularly spaced abutment members on said driven member equal in number to number of helical cam grooves in said head and forming a plurality of recesses engageable with said spherical connector members during the movement of said driving member in one direction to effect a driving connection between the connector members and said driven member to cause the driven member to be indexed from one position through said predetermined distance to another position and stopped in said latter position by said connector members in response to said axial movement in said one direction of the driving member.

6. An indexing mechanism comprising a driven member having a bore, means mounting said driven member for rotation about the axis of said bore and against axial movement, a driving member having a cylindrical head telescopingly mounted within the bore of said driven member, means for axially reciprocating said driving member, a plurality of equally spaced cam grooves in said head, spherical connector elements mounted in said cam grooves, a retaining member slidably mounted on said head for yieldably holding said connector elements in said cam grooves and in aligned relation relative to each other, said cam grooves having a helical portion adapted to impart an oscillating movement through a predetermined arc to said connector elements in response to relative movement between the cam grooves and the connector elements and having a straight axially disposed portion for restraining said connectors against oscillating movement, an annular groove in the bore of said driven member for receiving portions of said connector elements, said groove forming a shoulder to limit the axial movement of the connector elements in one direction in response to the movement in said direction of said driving member, a plurality of regularly spaced short grooves equal in number to said cam grooves extending axially from said annular groove for receiving portions of said connector elements therein to limit the axial movement of the connector elements in the opposite direction and to establish a driving connection between the connecting elements and the driven member whereby the oscillating movement of said connector elements in one direction is imparted to the driven member.

7. An indexing device comprising a driven member, means mounting said driven member for movement along a predetermined path, a row of equally spaced abutment members on said driven member arranged parallel to the path of movement thereof, a cam track disposed obliquely to said row of abutment members, means for guiding said cam track for reciprocatory movement in a direction transversely to said row of abutment members and through a stroke of predetermined length, a spherical cam follower movable with and along said cam track and engageable with said abutment members to establish a connection therebetween for moving said driven member with said follower and for stopping the movement of said driven member, means yieldably retaining said follower in position on said cam track for reciprocable movement therewith whereby said follower is caused to be moved with said cam track into and out of engagement with said abutment members during the reciprocation of said cam tracks, stop means engageable with said follower to limit the movement thereof with said cam track to a predetermined portion of the stroke of said cam track whereby in response to reciprocation of said cam track, said cam track is caused to move relative to said follower and impart an advance and return lateral movement to said follower through a distance equal to the spacing of said abutment members, said stop means being operable to stop the follower in a position in engagement with the abutment members during the movement of said cam track in one direction to establish a connection therewith and effect the indexing of the driven member from one position to the next position and stopping said driven member in said latter position, said stop means being operable during the movement of said cam track in the opposite direction to stop the follower in a position out of engagement with said abutment members and to effect the return of the follower to its initial position on said cam track.

8. A mechanism for imparting two steps of rotary movement to a member for each cycle of reciprocation of a driving member comprising a rotary member having a cylindrical portion, means mounting said rotary member for rotation about the axis of said cylindrical portion and against axial movement, a driving member mounted for axial reciprocation relative to said rotary member through a stroke of predetermined length, a first helical cam track on said driving member arranged in a right-hand direction, a first spherical cam follower engageable with said cam track, a first annular row of equally spaced abutments on the cylindrical portion of said rotary member engageable with said first follower for establishing a rotatable driving connection between the follower and the rotatable member, a second helical cam track on said driving member arranged in a left-hand direction, a second spherical cam follower engageable with said second helical cam track, a second annular row of equally spaced abutments on said cylindrical portion of said rotary member engageable with said second follower for establishing a rotary driving connection between the follower and said rotatable member, retainer means mounting said cam followers for limited movement with said cam tracks and for movement along said cam tracks, and stop means on said rotatable member for limiting the movement of said followers with said cams and said driving member to stop said followers alternately in positions in engagement with and disengaged from said abutments in response to reciprocation of said driving member and to effect relative movement between said driving member and said followers to oscillate said followers through a predetermined arc, alternate ones of said followers being moved in response to axial movement in each direction out of engagement with one set of abutments and into engagement with the other set of abutments and oscillated to index said rotatable member from one position through said predetermined arc to the following position and stop said rotatable member in said following position.

9. An indexing mechanism for imparting two steps of rotary movement to a driven member for each cycle of reciprocation of the driving member comprising a driven member having a cylindrical portion, means mounting said driven member for rotary movement about the axis of said cylindrical portion and against axial movement, a driving member having a cam track therein adjacent said cylindrical portion, means for axially reciprocating said driving member, a first and a second follower mounted on said cam track in spaced relation to each other, said cam track having a helical portion engageable with said first cam follower for imparting a rotary movement to said follower about said axis through a predetermined arc in response to movement in one direction of said driving member, said cam track having a second helical portion disposed in a reverse direction and associated with said second cam follower for imparting an oscillating movement to said second follower through said predetermined arc in response to a movement of the driving member in the opposite direction through less than a complete stroke, said cam track having an axially disposed portion extending from said second helical portion for holding said follower against rotation while permitting relative axial movement thereof, retaining members mounted on said driving member for yieldably retaining said followers on said track for limited axial movement therewith and for movement along said cam track, a plurality of abutments engageable with said first follower for establishing a rotatable driving connection between said follower and said driven member, said abutments being arranged in an annular row on the cylindrical portion of said driven member and spaced apart from each other a distance equal to said predetermined arc, stop means engageable with said first follower for limiting the axial movement thereof to and from an operative position in engagement with said first abutments and an inoperative position disengaged from said abutments, a plurality of abutments engageable with said second follower for establishing a rotatable driving connection between said second follower and said driven member, said abutments engageable with said second follower being arranged in an annular row on the cylindrical portion of said driven member and spaced apart from each other a distance equal to said predetermined arc, stop means engageable with said second follower for limiting the axial movement thereof to and from an inoperative position disengaged from said second abutments and an operative position in engagement with said second abutments whereby during the reciprocation of said driving member and in response to axial movement thereof in one direction the first follower is moved to its inoperative position and said second follower is moved to its operative position and is caused to rotate said rotatable member one step in one direction, and, in response to the movement of said driving member in the opposite direction, said second follower is moved to its inoperative position and said first follower is moved to its operative position and is caused to rotate said rotatable member another step in said same direction.

10. A mechanism for imparting two steps of rotary indexing movement to a member for each cycle of reciprocation of a driving member comprising a rotatable member having a cylindrical bore, means mounting said rotatable member for rotation about the axis of said bore, a non-rotatable member disposed in telescoping relation within the bore of said rotatable member, means for reciprocating one of said members relative to the other through a predetermined stroke, a pair of cam followers, a first helical cam on one of said members sloping in one direction and engageable with one of said followers for oscillating said follower about said axis through a predetermined arc, a second helical cam on said one member disposed in the opposite direction engageable with said second follower for oscillating said second follower through said predetermined arc, a first annular groove in said other member engageable with said first follower, a plurality of relatively short driving grooves in said other member extending axially in one direction from said annular groove engageable with said first follower for establishing a rotary driving connection therewith, a second annular groove in said other member engageable with said second follower, a plurality of relatively short driving grooves in said other member extending axially in the opposite direction from said second annular groove engageable with said second follower for establishing a rotary driving connection therewith, said driving grooves being spaced apart an angular distance equal to said predetermined arc, and means for yieldably holding said followers in position in said helical cam tracks, whereby, in response to a relative axial movement between the rotatable and non-rotatable members in one direction, said first follower is transferred from a position in engagement with said first driving grooves to a position in engagement with said first annular groove and said second follower is transferred from a position in engagement with said second follower to a position in engagement with said second driving grooves and is caused to rotate said rotatable member one step through said predetermined arc in one direction and, in response to a relative axial movement between the rotatable and the non-rotatable members in the opposite direction, said second follower is moved from a position in engagement with said second driving grooves to a position in engagement with said second annular groove and said first follower is moved from a position in engagement with said first annular groove to a position in engagement with said first driving grooves and is caused to rotate said rotatable member a second step in said one direction through said predetermined arc.

11. An indexing mechanism for rotating a member step by step in one direction in response to the movement in one direction of a reciprocatory actuating member comprising an annular driving element, means mounting said driving element for rotation about its axis and for reciprocation along said axis, a member disposed in telescoping relation within said annular driving element, a member having a bore disposed in telescoping relation about said annular driving element, means mounting one of said members for rotation about said axis and against axial movement, means mounting the other of said members against rotation and against axial movement, drive means individually connecting said driving element and each of said members and operable in response to axial movement of said driving element in one direction to rotate said driving element relative to said non-rotatable member and to rotate said rotatable member relative to said driving element, and means operable in response to axial movement of said driving element in the opposite direction to render said drive means inoperative to rotate said driving element and said rotatable member.

12. An indexing mechanism for rotating a member step by step in one direction in response to the movement in one direction of a reciprocatory actuating member comprising an annular driving element having an inner and outer cylindrical surface, means mounting said driving element for rotation about its axis and for reciprocation along said axis, a non-rotatable member mounted against axial movement in telescoping relation to one of said cylindrical surfaces of said driving element and forming a first pair of adjacent opposed relatively movable surfaces, a helical cam groove in one of said adjacent surfaces, a spherical connector element engageable in and movable along said cam groove and rotatable thereby through a predetermined arc about said axis in response to relative movement between said connector and said cam groove, holding means yieldably retaining said connector element in position in said cam groove, an annular groove in the other of said adjacent surfaces adapted to receive a portion of said connector element and guide said element for rotary movement in a plane, a plurality of regularly spaced relative short driving grooves extending axially from said annular groove adapted to receive said connector element to establish a rotatable driving connection therewith, means reciprocating said driving element through a stroke of predetermined length, a rotatable member mounted against axial movement in telescoping relation to the other of said cylindrical surfaces of said driving element and forming a second pair of adjacent opposed relatively movable surfaces, a helical cam groove in one of said second pair of adjacent surfaces, a spherical connector element engageable in and movable along said last-mentioned cam groove and rotatable thereby through a predetermined arc about said axis in response to a predetermined relative movement between the connector element and said cam groove, holding means yieldably retaining said last-mentioned connector element in position in said cam groove, an annular groove in the other one of said second pair of adjacent surfaces adapted to receive a portion of said connector element and guide said connector element for rotation in a plane, and a plurality of regularly spaced relatively short driving grooves extending axially from said last-mentioned annular groove adapted to receive said connector element to establish a rotary driving connection therewith, said holding means serving, in cooperation with said cam grooves and, in response to the axial movement of said driving element in one direction, to effect the transfer of the connector elements from an inoperative position disengaged from the driving grooves to an operative position in driving engagement with said driving grooves to cause said driving member to rotate relative to said non-rotatable member and to cause said rotatable member to rotate relative to said driving member.

13. An indexing mechanism for rotating a member step by step in one direction in response to the movement in one direction of a reciprocatory driving member comprising an annular driving element having inner and outer cylindrical surfaces, a rotatable member having a cylindrical surface telescopingly disposed relative to one cylindrical surface of said driving element and forming therewith a first pair of adjacent relatively movable surfaces, a non-rotatable member having a cylindrical surface telescopingly disposed relative to the other cylindrical surface of said driving element and forming therewith a second pair of adjacent relatively movable surfaces, means mounting said driving element for rotation about its axis and for reciprocation along said axis through a predetermined stroke, means mounting said rotary member for rotation about said axis and against axial movement, means mounting said non-rotatable member against rotation and against axial movement, means for reciprocating said driving element through a predetermined stroke, drive means interconnecting said non-rotatable member and said driving element for rotating said driving element a predetermined arcuate distance in response to axial movement in one direction of said driving element, and drive means connecting said driving element and said rotary member for rotating said non-rotatable element a predetermined arcuate distance relative to said driving element in response to axial movement in said one direction of said driving element, each of said driving means comprising a plurality of regularly spaced abutments arranged in an annular row on one of said adjacent relatively movable surfaces, a connector element movable to and from an inoperative position disengaged from said abutments and an operative position in rotary driving engagement with said abutments, a helical cam track on the other one of said adjacent relatively movable surfaces engageable with said cam follower for imparting a predetermined oscillation to said follower about said axis in response to reciprocation of said driving element, and means for alternately moving said followers to and from said operative and said inoperative positions in response to the initial movements in opposite directions of said driving element.

14. An indexing mechanism for rotating a member step by step in one direction in response to the axial movement in one direction of a reciprocable actuating member comprising an annular driving element, a member disposed in telescoping relation within said annular driving element, a member having a bore disposed in telescoping relation about said annular driving member, means mounting one of said members for rotation and against axial movement, means mounting the other of said members against rotation and against axial movement, means mounting said driving element for rotation about its axis and for reciprocation along said axis, means for reciprocating said driving element through a stroke of predetermined length, said driving element and said non-rotatable member having a first set of adjacent relatively rotatable and relatively reciprocable portions, said driving element and said rotatable member having a second set of adjacent relatively rotatable and relatively reciprocable portions, grooves in each of said relatively rotatable and relatively reciprocable portions, a spherical element having portions thereof extending into the grooves in each set of adjacent portions, the grooves in one of said adjacent portions of each set of adjacent relatively movable portions comprising an annular groove and a plurality of relatively short equally spaced driving grooves extending axially from said annular groove, the grooves in the other of said adjacent portions of each set of adjacent portions comprising a helical cam track for imparting an oscillating movement to said spherical element through an arc equal to the spacing of said driving grooves in response to relative axial movement between said driving element and said other members, and means for yieldably retaining each of said connector elements in position in its helical cam track whereby, in response to axial movement in one direction of said driving element, the connector elements are caused to be transferred to and from an inoperative position in the annular groove and an operative position in rotary driving engagement with said driving grooves and are caused to impart rotation of the driving element relative to said non-rotatable member and simultaneously therewith to impart rotation of the rotary member relative to said driving element during the movement in one direction of the driving element.

15. An indexing mechanism for rotating a member step by step in one direction comprising an annular driving element having outer and inner cylindrical surfaces, means mounting said driving element for rotation about its axis and for reciprocation along said axis, a rotatable member having a bore disposed in telescoping relation about said driving element, means mounting said rotatable element for rotation about said axis and against axial movement, a non-rotatable member disposed in telescoping relation within said annular driving element, means mounting said non-rotatable member against rotation and against axial movement, an annular groove formed on the inner surface of said annular driving element, a plurality of equally spaced driving grooves in said driving element extending axially from said annular groove, a helical cam groove formed in said non-rotatable member, a cam follower having portions thereof engageable in said cam groove and in the annular and the driving grooves formed in said driving element, a retaining member slidably mounted on said non-rotatable member engageable with said cam follower for yieldably holding said follower in position in said cam groove, an annular groove formed in the bore of said rotatable member, a plurality of relatively short equally spaced driving grooves extending axially from said annular groove in the rotatable member, a helical cam formed in the outer surface of said annular driving element, a cam follower having portions engageable in the helical cam groove in said driving element and the annular and the driving grooves in said driven member, a retainer member slidably mounted on said driving element for yieldingly holding said follower in position in the helical cam groove, the parts being arranged so that, in response to the axial movement of the driving element in one direction, said followers are moved into said driving grooves and are caused to impart a rotation of said driving element relative to said non-rotatable member and to impart rotation to said rotatable member relative to said driving element.

16. A device for translating a reciprocatory motion into a step-by-step rotary motion comprising a rotary member, means mounting said rotary member for rotation about an axis, a non-rotatable member, means for axially reciprocating said nonrotatable member through a predetermined distance, a helical cam on one of said members, a spherical cam follower, means yieldably retaining said follower on said cam for limited movement axially with said cam and for movement along said cam, means forming an annular row of regularly spaced axially directed slots on the other of said members, a pair of spaced stop means on the other of said members for limiting the axial movement of said follower with said cam during the reciprocation of said nonrotatable member to and from a position in engagement with one of said slots and a position disengaged from said slots and to cause a relative movement between the cam and the follower in response to reciprocation of said nonrotatable member for effecting the oscillation of said follower through a predetermined arc, said follower being operable in response to movement of said nonrotatable member in one direction to move into driving engagement with said rotatable member and to index said rotatable member from one position through said predetermined arc to another position and to stop said rotatable member in said latter position.

17. A mechanism for converting a reciprocatory motion in one direction into a step-by-step motion in another direction comprising a driving member, means for reciprocating said driving member through a predetermined distance along a predetermined axis, a cam track on said driving member, a cam follower, means yieldably retaining said follower for axial movement with said cam track and for movement along said cam track, a driven member, means mounting said driven member for movement in a predetermined path, a plurality of spaced abutments on said driven member engageable with said follower, spaced stop means for limiting the axial movement of said follower with said cam to stop said follower in an operative position in driving engagement with said abutments in response to movement of said driving member in one direction and for stopping said follower in an inoperative position disengaged from said abutments in response to axial movement of the driving member in the opposite direction and to effect a movement of the driving member relative to the follower in response to reciprocation of said driving member, said cam track having a portion disposed obliquely relative to the direction of reciprocation of the driving member for imparting a predetermined lateral movement to said follower in response to a portion of the axial movement of the driving member and having an axially directed portion for holding said follower against lateral movement during another portion of the axial movement of the driving member.

18. A device for translating reciprocatory motion into a step-by-step rotary motion comprising a rotatable member, means mounting said rotatable member for rotation about an axis, a nonrotatable member mounted for axial reciprocation, a cam on one of said members having a helical portion and an axially directed portion, a cam follower, means yieldably retaining said follower on said cam for limited movement with said cam and for movement along the helical and axially directed portions of said cam, a plurality of spaced abutments on said other member engageable with said follower during the movement thereof in one direction, spaced stop means on said other member for limiting the axial movement of said follower with said cam during the reciprocation of said nonrotatable member to cause a relative movement between the cam and the follower for effecting the oscillation of said follower through a predetermined arc during a predetermined portion of axial movement of said nonrotatable member in one direction, and means for axially reciprocating said nonrotatable member through a predetermined distance to cause said follower to be moved into engagement with said abutments to establish a connection therewith and to cause relative movement between said helical and axially directed portions of said cam and said follower whereby said follower and the rotatable member connected thereto are caused to be rotated through said predetermined arc during a predetermined portion of said axial movement and to be held against rotary movement during another portion of said axial movement of the nonrotatable member.

19. A mechanism for imparting two steps of rotary movement to a member for each cycle of reciprocation of a driving member comprising a rotatable member having a cylindrical portion, means mounting said rotatable member for rotation about the axis of said cylindrical portion and against axial movement, a driving member mounted for axial reciprocation, a cam track on said driving member having a first section comprising a helical portion of one pitch and having a second section comprising a helical portion of another pitch and an axially directed portion extending from one end of said helical portion, one of said helical portions being disposed in a righthand direction and the other in a lefthand direction, a first cam follower and a second cam follower associated with said first section and said second section, respectively, of said cam track, means for yieldably retaining said followers on said cam track for limited axial movement therewith and for movement along said cam track, means on said rotatable member engageable with said first follower for establishing a rotary driving connection between said follower and said rotatable member in response to axial movement of said driving member in one direction, means on said driven member engageable with said second follower for establishing a rotary driving connection between said follower and said rotatable member in response to axial movement of said driving member in the opposite direction, and stop means on said rotatable member for limiting the movement of said followers with said driving members to stop said followers alternately in positions in engagement with and disengaged from said means in response to reciprocation of said driving member and to effect relative movement between said driving member and said followers to oscillate said followers through a predetermined arc.

20. A mechanism for imparting two steps of rotary indexing movement to a member for each cycle of reciprocation of a driven member comprising a driven member having a bore, means mounting said driven member for rotary movement about the axis of said bore and against axial movement, a driving member mounted within the bore of said driven member, means for reciprocating said driving member through a predetermined length, a cam track on said driving member having a first helical portion arranged in a righthand direction and a second helical portion arranged in a lefthand direction, a first spherical cam follower and a second spherical cam follower engageable with said first helical portion and said second helical portion, respectively, of said cam track, retainer members for said followers to yieldably retain said followers on said cam track for limited axial movement therewith and for movement along said cam track, stop means on the driven member for limiting the axial movement of the followers with said cam track to a predetermined portion of the stroke of said driving member whereby in response to reciprocation of said driving member said followers are caused to oscillate simultaneously in opposite directions through a predetermined arc, means forming two annular rows of regularly spaced axially directed recesses on said driven member alternately engageable and disengageable with said followers during the axial movement of said followers with said driving member in opposite directions for establishing driving connections between alternate followers and the driven member whereby the driven member is caused to be indexed from one position through said predetermined arc to a following position and stopped in said latter position in respose to axial movement in each direction of said driving member.

NILS H. SWANSON.

REFERENCES CITED

The following references are of record in the file of this patent:

UNITED STATES PATENTS

| Number | Name | Date |
| --- | --- | --- |
| 594,741 | Harwood | Nov. 30, 1887 |
| 771,864 | Eager | Mar. 7, 1903 |
| 1,946,309 | Coffman | Feb. 6, 1934 |